United States Patent [19]

Miyoshi et al.

[11] Patent Number: 5,264,927
[45] Date of Patent: Nov. 23, 1993

[54] METHOD AND APPARATUS FOR PROCESSING COLOR SIGNALS TO CONVERT BETWEEN COLORIMETRIC SYSTEMS

[75] Inventors: Tadayoshi Miyoshi, Miura; Takashi Kuriyama, Yokohama; Ichiro Shishido, Kashiwa; Masaru Osada, Noda; Kaoru Kitami, Nagareyama, all of Japan

[73] Assignee: Victor Company of Japan, Ltd., Yokohama, Japan

[21] Appl. No.: 658,141

[22] Filed: Feb. 20, 1991

[30] Foreign Application Priority Data

| Feb. 22, 1990 | [JP] | Japan | 2-42118 |
| Feb. 26, 1990 | [JP] | Japan | 2-44964 |
| Jul. 16, 1990 | [JP] | Japan | 2-187784 |
| Jul. 16, 1990 | [JP] | Japan | 2-187785 |
| Jul. 16, 1990 | [JP] | Japan | 2-187788 |

[51] Int. Cl.$^5$ ............................................. H04N 1/46
[52] U.S. Cl. ................................. 358/527; 358/500; 395/131
[58] Field of Search ................ 358/75, 80; 395/131

[56] References Cited

U.S. PATENT DOCUMENTS

| 4,763,283 | 8/1988 | Coutrot | 395/131 |
| 4,862,255 | 8/1989 | Takanashi | 358/80 |
| 4,992,861 | 2/1991 | D'Errico | 358/80 |

FOREIGN PATENT DOCUMENTS 52-16403  5/1977  Japan .
56-14974  4/1981  Japan .
58-16180  3/1983  Japan .
59-41227  10/1984  Japan .

*Primary Examiner*—Edward L. Coles, Sr.
*Assistant Examiner*—Jill Jackson
*Attorney, Agent, or Firm*—Lowe, Price, LeBlanc & Becker

[57] ABSTRACT

A first set of different color signals represented in a colorimetric system is converted into a second set of different color signals represented in another colorimetric system. Predetermined main parts of the second set of the color signals are determined in response to predetermined first portions of the first set of the color signals. Calculation coefficients are determined in response to the first portions of the first set of the color signals. Predetermined subordinate parts of the second set of the color signals are calculated from predetermined second portions of the first set of the color signals and the calculation coefficients according to an interpolation. The determined main parts of the second set of the color signals and the calculated subordinate parts of the second set of the color signals are combined into a whole of the second set of the color signals. The calculation coefficients are designed so that, if the color signals in the first set vary by equal values, achromatic color data which results from the calculation lies on an achromatic color axis in a color space defined with respect to the readout data of the main parts of the second set of the color signals, and that the sum of squared errors of color conversion is minimized.

7 Claims, 11 Drawing Sheets

METHOD AND APPARATUS FOR PROCESSING COLOR SIGNALS TO CONVERT BETWEEN COLORIMETRIC SYSTEMS

BACKGROUND OF THE INVENTION

This invention relates to a method and an apparatus for processing color signals which convert color signals represented in a colorimetric system to signals represented in another colorimetric system and are usable in various color systems such as color television cameras, color image scanners, or color copying machines.

In some cases, the conversion of color signals in a first colorimetric system to color signals in a second colorimetric is performed for color correction or color adjustment. Such color signal conversion is realized by use of a ROM having a map or table in which sets of data of color signals in the second colorimetric system are stored in different storage locations designated in response to color signals in the first colorimetric system. In the ROM-based color signal conversion, a greater capacity is required of the ROM as the quantity of information represented by the color signals is increased. It is known to combine a color data interpolation technique with the ROM-based color signal conversion to reduce the required capacity of the ROM.

Japanese published examined patent application 52-16403, Japanese published examined patent application 56-14974, Japanese published examined patent application 58-16180, and Japanese published examined patent application 59-41227 disclose methods of processing color signals to execute color correction in color systems such as color image scanners or color facsimile machines. These prior art methods have some problems in accuracy of color correction and simplicity of associated machine structures.

SUMMARY OF THE INVENTION

It is an object of this invention to provide an improved method of processing color signals.

It is another object of this invention to provide an improved apparatus for processing color signals.

According to a first aspect of this invention, in a conversion of a first set of different digital color signals represented in a first colorimetric system into a second set of different color signals represented in a second colorimetric system by use of a memory storing data of predetermined main parts of the second set of the color signals and data of calculation coefficients which are designed to vary as functions of first portions of the first set of the color signals, each of which first portions is represented by a predetermined number of upper bits from among total bits representing each of the different digital color signals, a method comprises the steps of combining the first portions of the first set of the color signals into an address signal; applying the address signal to the memory, reading out data of the main parts of the second set of the color signals from the memory which correspond to the first portions of the first set of the color signals, and reading out data of the calculation coefficients from the memory which correspond to the first portions of the first set of the color signals; calculating, for interpolation, subordinate parts of the second set of the color signals from second portions of the first set of the color signals, each of which second portions is represented by a predetermined number of the remaining lower bits from among the total bits representing each of the different digital color signals, and the readout data of the calculation coefficients according to an interpolation using a predetermined function between the second portions of the first set of the color signals and the readout data of the calculation coefficients, the predetermined function being expressed by a polynomial having two or more terms; and combining the readout data of the main parts of the second set of the color signals and the calculated subordinate parts of the second set of the color signals into a whole of the second set of the color signals; wherein the calculation coefficient data are designed so that, if the color signals in the first set vary by equal values, achromatic color data which results from the calculation lies on an achromatic color axis in a color space defined with respect to the readout data of the main parts of the second set of the color signals, and that the sum of squared errors of color conversion in cases where respective either one from among the color signals in the first set varied solely, and squared errors in cases where respective two except either one from among the color signals in the first set vary together is minimized.

According to a second aspect of this invention, in a conversion of a first set of different color signals represented in a first colorimetric system into a second set of different color signals represented in a second colorimetric system by use of a memory storing data of predetermined main parts of the second set of the color signals and data of calculation coefficients which are designed to vary as functions of first portions of the first set of the color signals, each of which first portions is represented by a predetermined number of upper bits from among total bits representing each of the different digital color signals, an apparatus comprises means for combining the first portions of the first set of the color signals into an address signal; means for applying the address signal to the memory, reading out data of the main parts of the second set of the color signals from the memory which correspond to the first portions of the first set of the color signals, and reading out data of the calculation coefficients from the memory which correspond to the first portions of the first set of the color signals; means for calculating subordinate parts of the second set of the color signals from second portions of the first set of the color signals, each of which second portions is represented by a predetermined number of the remaining lower bits from among the total bits representing each of the different digital color signals, and the readout data of the calculation coefficients according to an interpolation using a predetermined function between the second portions of the first set of the color signals and the readout data of the calculation coefficients, the predetermined function being expressed by a polynomial having two or more terms; and means for combining the readout data of the main parts of the second set of the color signals and the calculated subordinate parts of the second set of the color signals into a whole of the second set of the color signals; wherein the calculation coefficient data are designed so that, if the color signals in the first set vary by equal values, achromatic color data which results from the calculation lies on an achromatic color axis in a color space defined with respect to the readout data of the main parts of the second set of the color signals, and that the sum of squared errors of color conversion in cases where respective either one from among the color signals in the first set varied solely, and squared errors in cases where respective two except either one from among the color signals in the first set vary together is minimized.

According to a third aspect of this invention, an apparatus comprises means for determining predetermined main parts of output color signals represented in a second colorimetric system in response to first portions of input digital color signals represented in a first colorimetric system, each of which first portions is represented by a predetermined number of upper bits from among total bits representing each of the different digital color signals; means for selecting one of sets of predetermined calculation coefficients in response to the first portions of the input color signals; means for calculating subordinate parts of the output color signals from second portions of the input color signals, each of which second portions is represented by a predetermined number of remaining lower bits from among the total bits representing each of the different digital color signals, and the selected calculation coefficients according to an interpolation using a predetermined function between the second portions of the input color signals and the selected calculation coefficients, the predetermined function being expressed by a polynomial having two or more terms; and means for combining the determined main parts of the output color signals and the calculated subordinate parts of the output color signals into a whole of the output color signals; wherein the predetermined calculation coefficients are designed so that, if the input color signals vary by equal values, achromatic color data represented by the output color signals remains on an achromatic color axis in a color space defined with respect to the determined main parts of the output color signals; and wherein the predetermined calculation coefficients are chosen according to a least squares method executed on condition that one or more of the input color signals vary.

According to a fourth aspect of this invention, an apparatus comprises means for determining predetermined main parts of output digital color signals in response to predetermined first portions of input digital color signals; means for selecting one of sets of predetermined calculation coefficients in response to the first portions of the input color signals; means for calculating predetermined subordinate parts of the output color signals from predetermined second portions of the input color signals and the selected calculation coefficients according to an interpolation using a predetermined function between the second portions of the input color signals and the selected calculation coefficients; and means for combining the determined main parts of the output color signals and the calculated subordinate parts of the output color signals into a whole of the output color signals; wherein the predetermined calculation coefficients are designed so that, if the input color signals vary by equal values, achromatic color data represented by the output color signals remains on an achromatic color axis in a color space defined with respect to the determined main parts of the output color signals; and wherein the predetermined calculation coefficients are chosen according to a least squares method executed on condition that at least one of the input color signals varies.

DESCRIPTION OF THE FIRST PREFERRED EMBODIMENT

Figure 1:
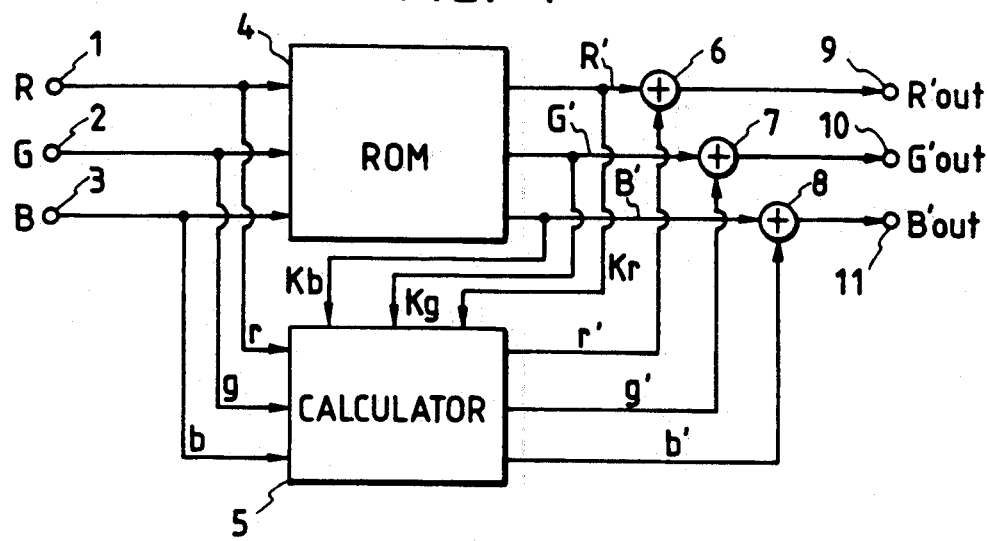
FIG. 1 is a block diagram of a color signal processing apparatus according to a first embodiment of this invention.

With reference to FIG. 1, input terminals 1, 2, and 3 are subjected to three input digital color data represented in a first colorimetric system, that is, red data R, green data G, and blue data B, respectively. Each of the input color data R, G, and B is represented by a predetermined number of bits (8 bits in the embodiment).

A predetermined number of higher bits (four higher bits in the embodiment) of each of the input color data R, G, and B are fed to a ROM 4 storing a look-up table which has second red data R', second green data G', and second blue data B' represented in a second colorimetric system. The second color data R', G', and B' are predetermined as a function of the four higher bits each of the input color data R, G, and B in a known way. The four higher bits of the input red data R, the four higher bits of the input green data G, and the four higher bits of the input blue data B compose an address signal to the ROM 4, and the corresponding second color data R', G', and B' are read out from the ROM 4 in response to the address signal. The look-up table in the ROM 4 also has interpolation coefficient data Kr, Kg, and Kb related to red, green, and blue respectively. The coefficient data Kr, Kg, and Kb are predetermined as a function of the four higher bits each of the input color data R, G, and B, and are read out together with the second color data R', G', and B' from the ROM 4 in response to the address signal.

Figure 2:
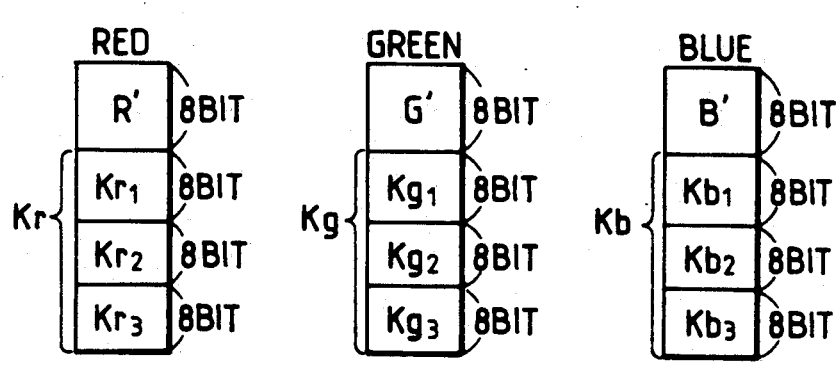
FIG. 2 is a diagram showing color data and coefficient data outputted from the ROM of FIG. 1.

As shown in FIG. 2, each of the second color data R', G', and B' has 8 bits. The coefficient data Kr is separated into three components Kr1, Kr2, and Kr3 each having 8 bits. The second red data R' and the coefficient data Kr compose a red group. The coefficient data Kg is separated into three components Kg1, Kg2, and Kg3 each having 8 bits. The second green data G' and the coefficient data Kg compose a green group. The coefficient data Kb is separated into three components Kb1, Kb2, and Kb3 each having 8 bits. The second blue data B' and the coefficient data Kb compose a blue group.

Four lower bits of each of the input color data R, G, and B are fed to a calculator 5. The coefficient data Kr, Kg, and Kb are fed from the ROM 4 to the calculator 5. The four lower bits of the input red data R are represented by "r". The four lower bits of the input green data G are represented by "g". The four lower bits of the input blue data B are represented by "b". The calculator 5 calculates interpolation red data r', interpolation green data g', and interpolation blue data b' from the input color data "r", "g", and "b" and the coefficient data Kr, Kg, and Kb according to the following equations.

$$r' = Kr1 \cdot r + Kr2 \cdot g + Kr3 \cdot b$$

$$g' = Kg1 \cdot r + Kg2 \cdot g + Kg3 \cdot b$$

$$b' = Kb1 \cdot r + Kb2 \cdot g + Kb3 \cdot b.$$

It should be noted that, though each of the equations for calculating the interpolation data is expressed by a linear trinomial in the embodiment, it may be another polynomial having two or more terms with respect to components represented by the lower bits of the input data in the invention.

Figure 3:
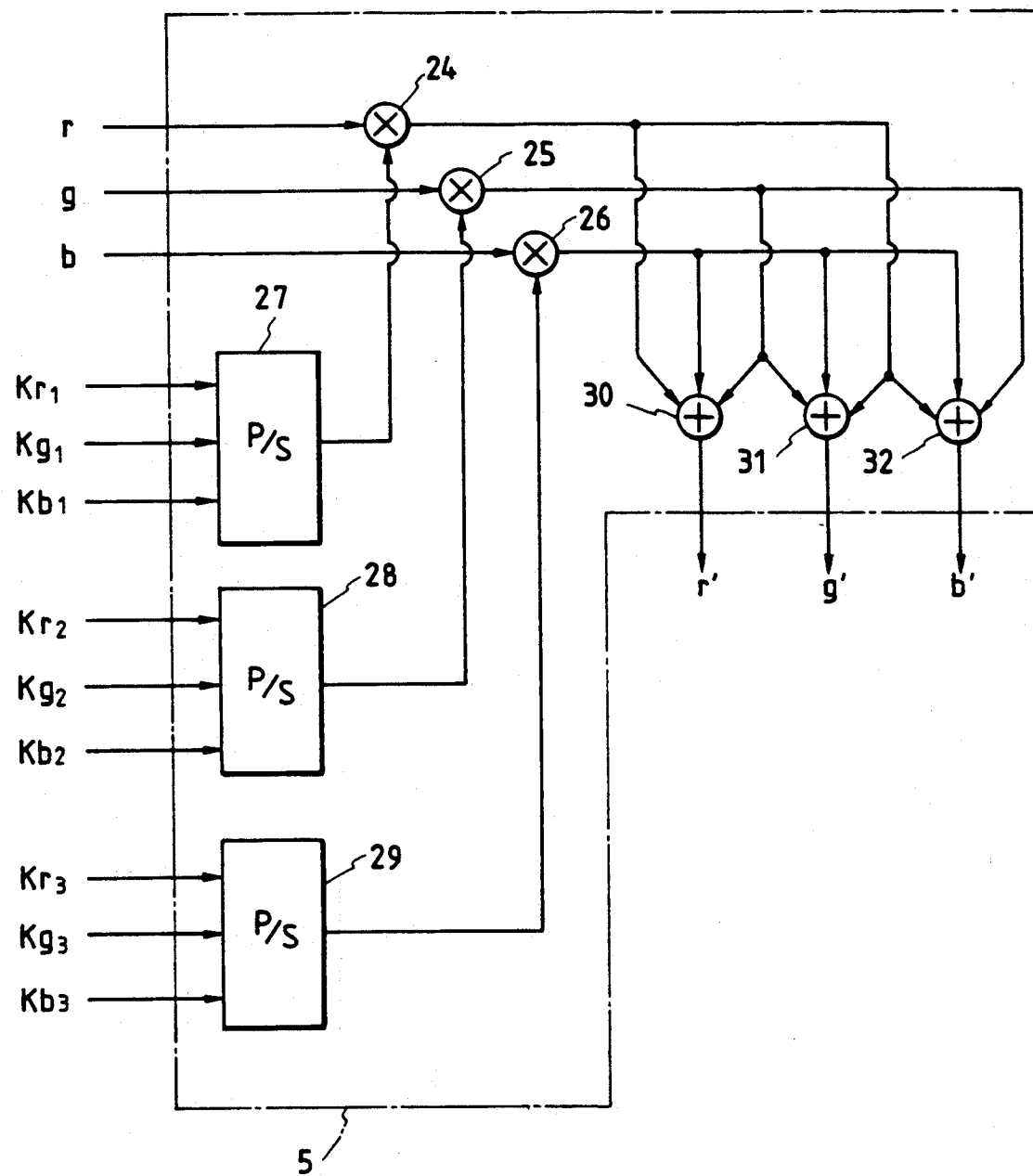
FIG. 3 is a block diagram of the calculator of FIG. 1.

As shown in FIG. 3, the calculator 5 includes multipliers 24, 25, and 26, parallel-to-serial (P/S) converters 27, 28, and 29, and adders 30, 31, and 32. The P/S converter 27 converts the parallel coefficient data Kr1, Kg1, and Kb1 into corresponding serial data. The P/S converter 28 converts the parallel coefficient data Kr2, Kg2, and Kb2 into corresponding serial data. The P/S converter 29 converts the parallel coefficient data Kr3, Kg3, and Kb3 into corresponding serial data. The multiplier 24 multiplies the input red data "r" by the output data from the P/S converter 27, generating data Kr1·r, Kg1·r, and Kb1·r. The multiplier 25 multiplies the input green data "g" by the output data from the P/S converter 28, generating data Kr2·g, Kg2·g, and Kb2·g. The multiplier 26 multiplies the input blue data "b" by the output data from the P/S converter 29, generating data Kr3·b, Kg3·b, and Kb3·b. The adder 30 adds the output data from the multipliers 24, 25, and 26, generating the interpolation data r'. The adder 31 adds the output data from the multipliers 24, 25, and 26, generating the interpolation data g'. The adder 32 adds the output data from the multipliers 24, 25, and 26, generating the interpolation data b'.

The second color data R', G', and B' are fed from the ROM 4 to adders 6, 7, and 8 respectively. The interpolation data r', g', and b' are fed from the calculator 5 to the adders 6, 7, and 8 respectively. The adder 6 adds the second red data R' and the interpolation data r', generating final red data R' out which is fed to an output terminal 9. The adder 7 adds the second green data G' and the interpolation data g', generating final green data G' out which is fed to an output terminal 10. The adder 8 adds the second blue data B' and the interpolation data b', generating final green data B' out which is fed to an output terminal 11.

Figure 4:
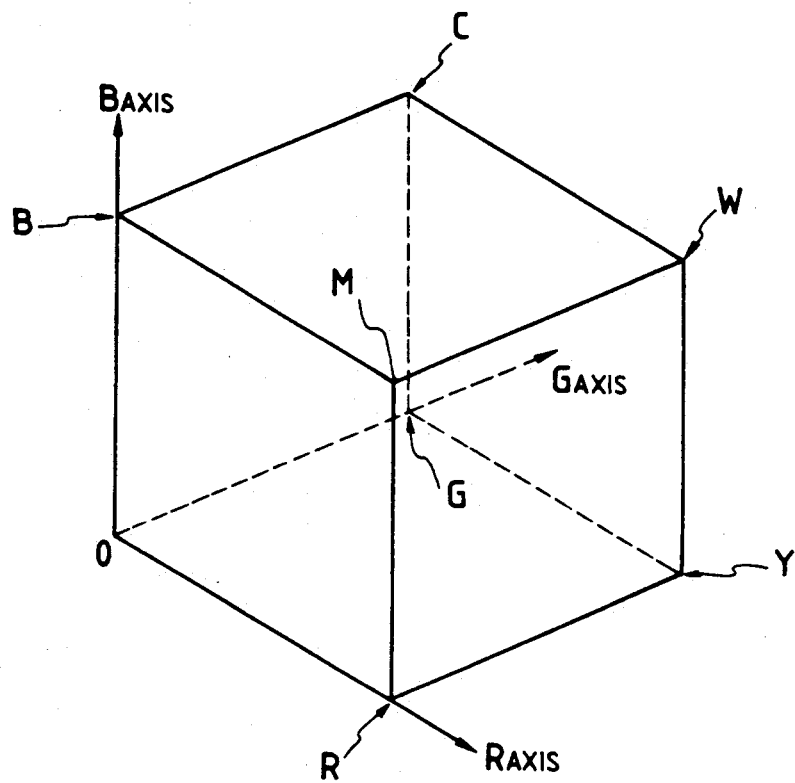
FIG. 4 is a diagram of a cube in a color space.
Figure 5:
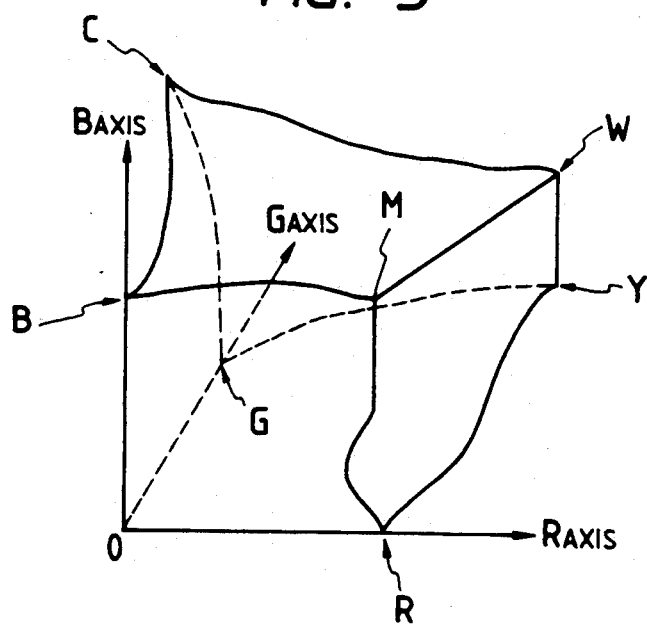
FIG. 5 is a diagram of a distortion generated by mapping.

As shown in FIG. 4, a color signal composed of red, green, and blue data represented in a first colorimetric system can be expressed in a three-dimensional orthogonal coordinate system which corresponds to a color space determined by perpendicular R, G, and B axes corresponding to red, green, and blue data respectively. The R, G, and B axes intersect at the origin O. A color space cube has vertexes which agree with the origin O and points R, G, B, C, Y, M, and W. The points R, G, and B are located on the R, G, and B axes respectively and are equally distant from the origin O. The point C is located on the B-G plane. The point Y is located on the R-G plane. The point M is located on the R-B plane. The points C, Y, and M are equally distant from the origin O. The point W is opposite to the origin O. When the color space cube represented in a first colorimetric system is mapped into a color space represented in another colorimetric system, it is distorted in some cases as shown in FIG. 5.

Figure 6:
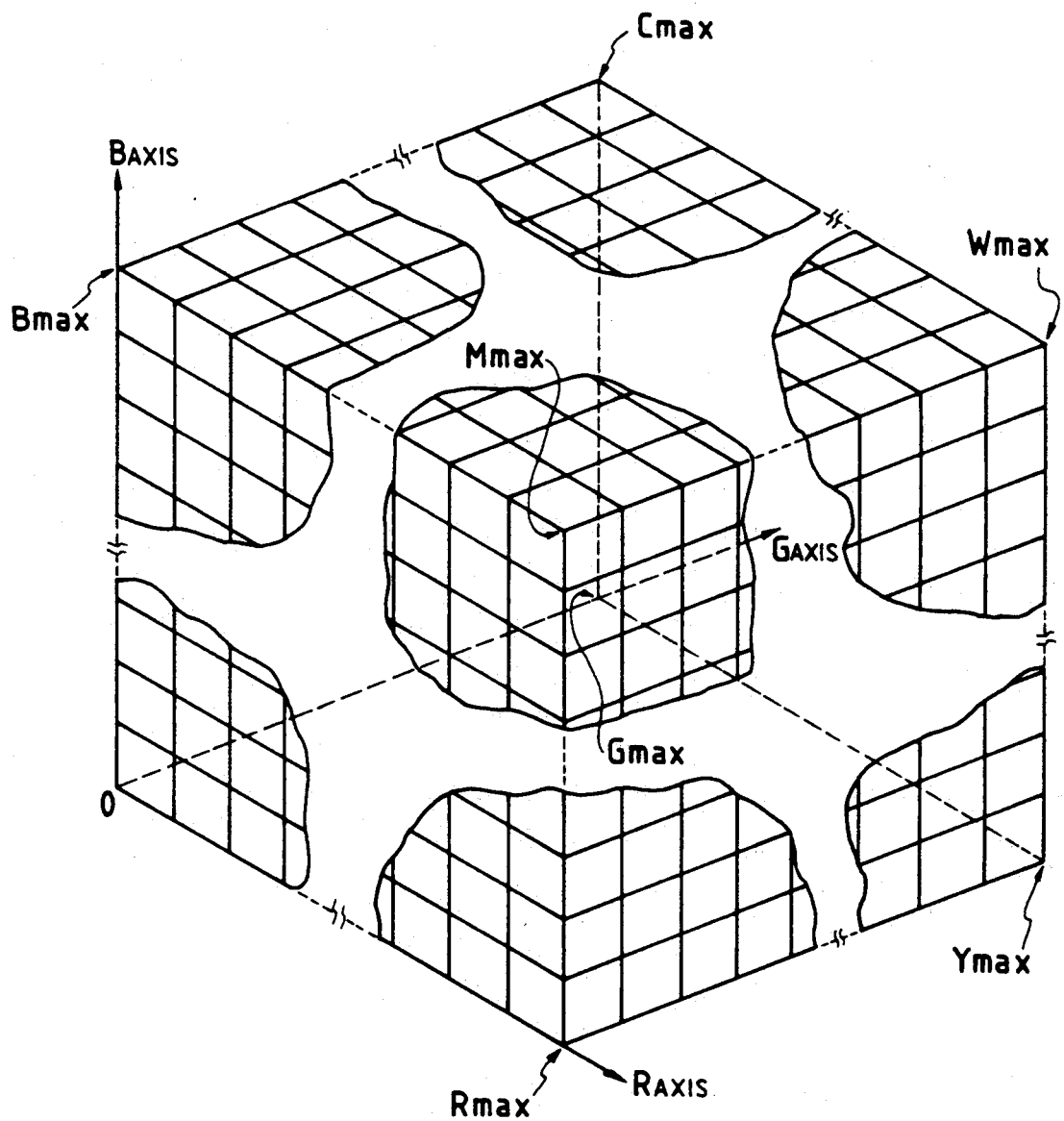
FIG. 6 is a diagram of a cube composed of divided segments in a color space.

FIG. 6 shows a similar color space cube defined by the origin O and points Rmax, Gmax, Bmax, Cmax, Ymax, Mmax, and Wmax. Each of the R-axis edge, the G-axis edge, and the B-axis edge of the cube is equally divided by a given number N, and the cube is divided into $N^3$ small cubic segments. When each of color data R, G, and B has "n" bits, the number N is given by the relation as "$N = 2^n$". For example, when each of color data R, G, and B has 8 bits, the cube is divided into $256^3$ small cubic segments.

In this embodiment, the cube is divided into $16^3$ small cubic segments in accordance with the four higher bits of the input red data R, the four higher bits of the input green data G, and the four higher bits of the input blue data B. The second color data R', G', and B' represented in a second colorimetric system and outputted from the ROM 4 in response to the three sets of the four higher bits each of the input color data R, G, and B are selected from predetermined data corresponding to the vertexes of the small cubic segments.

As described previously, the calculator 5 calculates the interpolation data r', g', and b' from the three sets of the four lower bits of the input color data R, G, and B and the coefficient data Kr, Kg, and Kb. The coefficient data Kr, Kg, and Kb are given by the ROM 4 in response to the three sets of the four higher bits each of the input color data R, G, and B. The final color data R'out, G'out, and B'out are generated by combining the second color data R', G', and B' and the interpolation data r', g', and b'.

Figure 7:
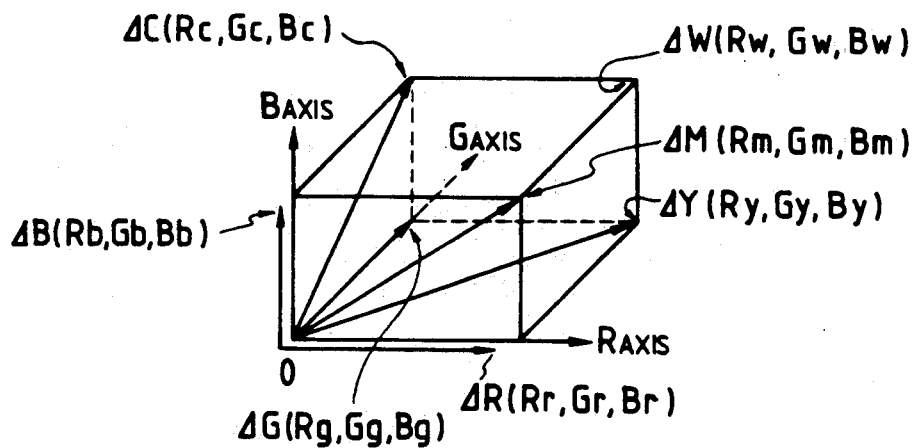
FIG. 7 is a diagram of a box in a color space related to the first embodiment.

The coefficient data Kr1, Kr2, Kr3, Kg1, Kg2, Kg3, Kb1, Kb2, and Kb3 in the ROM 4 are predetermined by using, for example, a computer. Specifically, the coefficient data Kr1, Kr2, Kr3, Kg1, Kg2, Kg3, Kb1, Kb2, and Kb3 are chosen so as to satisfy the following equations.

$$Kr1 + Kr2 + Kr3 = Rw$$

$$Kg1 + Kg2 + Kg3 = Gw$$

$$Kb1 + Kb2 + Kb3 = Bw$$

where Rw, Gw, and Bw denote the respective coordinate components in the second colorimetric system of a vertex point $\Delta W$ of FIG. 7 which shows a box in a color space related to variations in color data. These equations are conditions of the fact that, if respective color data vary by equal values, achromatic color data which results from the calculation lies on the achromatic color axis connecting the origin O and the point $\Delta W$ in the color space defined with respect to the output color data from the ROM 4, and any tonal jump is prevented. Thus, the interpolation process executed by use of the ROM 4 and the calculator 5 does not cause a deterioration in the white balance and a tonal jump.

With reference to FIG. 7, vertex points $\Delta R$, $\Delta G$, $\Delta B$, $\Delta C$, $\Delta Y$, and $\Delta M$ are present in addition to the origin O and the vertex point $\Delta W$. With respect to independent variations of three color data in the first colorimetric system, the sums $\delta r$, $\delta g$, and $\delta b$ of the squares of the errors from the points $\Delta R$, $\Delta G$, $\Delta B$, $\Delta C$, $\Delta Y$, and $\Delta M$ are defined for respective color components in the second colorimetric system as follows.

$$\delta r = (Kr1-Rr)^2 + (Kr2-Rg)^2 + (Kr3-Rb)^2 + (Kr1+Kr2-Ry)^2 + (Kr1+Kr3-Rm)^2 + (Kr2+Kr3-Rc)^2$$

$$\delta g = (Kg1-Gr)^2 + (Kg2-Gg)^2 + (Kg3-Gb)^2 + (Kg1+Kg2-Gy)^2 + (Kg1+Kg3-Gm)^2 + (Kg2+Kg3-Gc)^2$$

$$\delta b = (Kb1-Br)^2 + (Kb2-Bg)^2 + (Kb3-Bb)^2 + (Kb1+Kb2-By)^2 + (Kb1+Kb3-Bm)^2 + (Kb2+Kb3-Bc)^2.$$

The coefficient data Kr1, Kr2, Kr3, Kg1, Kg2, Kg3, Kb1, Kb2, and Kb3 are chosen so as to minimize the sums $\delta r$, $\delta g$, and $\delta b$ by use of the least squares method. This design prevents a great color jump for each color which would be caused by a color space distortion.

DESCRIPTION OF THE SECOND PREFERRED EMBODIMENT

Figure 8:
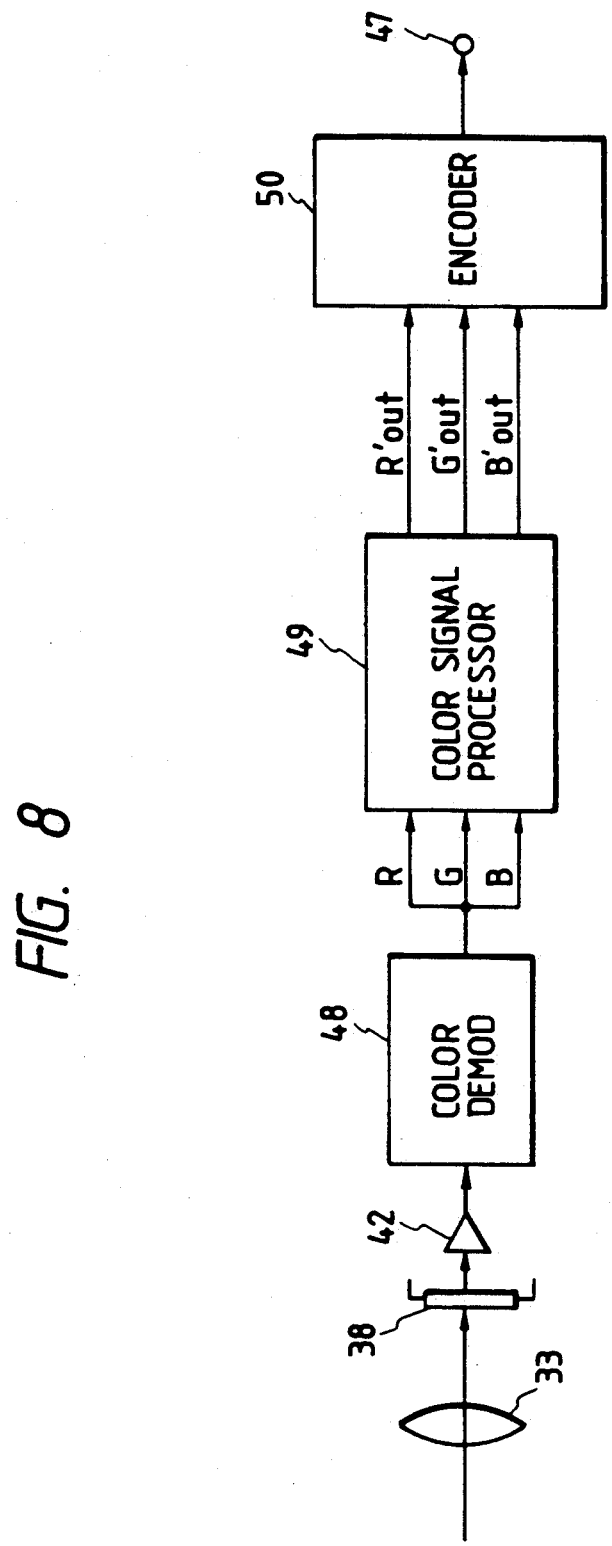
FIG. 8 is a block diagram of a color television camera according to a second embodiment of this invention.

With reference to FIG. 8, a color television camera includes a lens 33 by which an image of an object is formed on an image pickup section 38 including an image pickup element array. The image pickup section 38 converts the image of the object into a corresponding color-multiplexed television signal. The color-multiplexed television signal is fed from the image pickup section 38 to a color signal demodulator 48 via a preamplifier 42. The color signal demodulator 48 separates the color-multiplexed television signal into color signals R, G, and B which are fed to a color signal processor 49. The design of the color signal processor 49 is similar to the design of the color signal processor of FIG. 1. The color signal processor 49 processes the input color signals R, G, and B and converts the input color signals R, G, and B into output color signals R'out, G'out, and B'out. The color signal processor 48 is designed so as to execute various signal processings such as black level reproduction processing, tone processing, color reproduction processing, and bright-part dynamic range processing. For aperture compensation, the color signals R'out, G'out, and B'out are processed by an encoder 50. The output signal from the encoder 50 is applied to an output terminal 47.

DESCRIPTION OF THE THIRD PREFERRED EMBODIMENT

Figure 9:
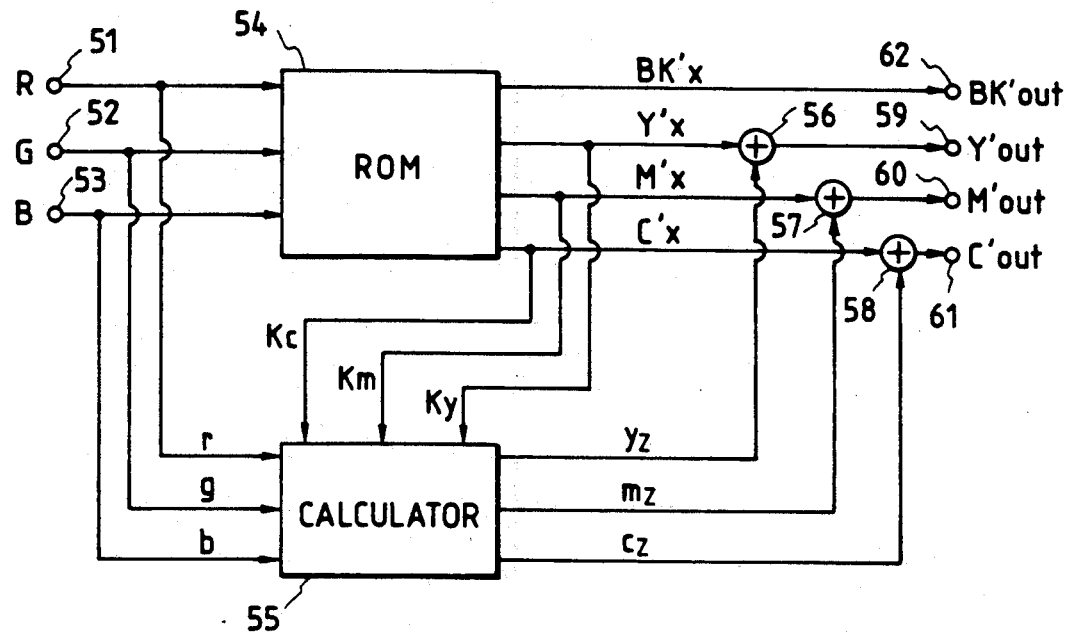
FIG. 9 is a block diagram of a color signal processing apparatus according to a third embodiment of this invention.

With reference to FIG. 9, input terminals 51, 52, and 53 are subjected to three input color data, that is, red data R, green data G, and blue data B, respectively. Each of the input color data R, G, and B has 8 bits.

Four higher bits of each of the input color data R, G, and B are fed to a ROM 54 storing a look-up table which has yellow data Y'x, magenta data M'x, cyan data C'x, and achromatic color (black) data Bk'x. The color data Y'x, M'x, C'x, and Bk'x are predetermined as a function of the four higher bits of each of the input color data R, G, and B in a known way. The four higher bits of the input red data R, the four higher bits of the input green data G, and the four higher bits of the input blue data B compose an address signal to the ROM 54, and the corresponding color data Y'x, M'x, C'x, and Bk'x are read out from the ROM 54 in response to the address signal. The look-up table in the ROM 54 also has interpolation coefficient data Ky, Km, and Kc related to yellow, magenta, and cyan respectively. The coefficient data Ky, Km, and Kc are predetermined as a function of the four higher bits of each of the input color data R, G, and B. The four higher bits of the input red data R, the four higher bits of the input green data G, and the four higher bits of the input blue data B compose an address signal to the ROM 54, and the corresponding coefficient data Ky, Km, and Kc are read out from the ROM 54 in response to the address signal.

Figure 10:
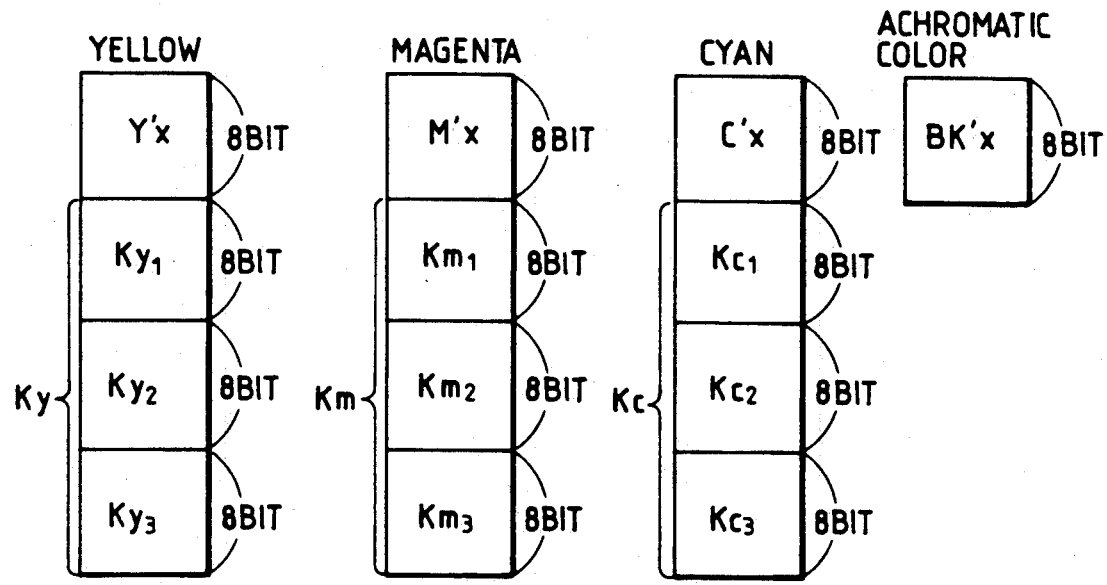
FIG. 10 is a diagram showing color data and coefficient data outputted from the ROM of FIG. 9.

As shown in FIG. 10, each of the color data Y'x, M'x, C'x, and Bk'x has 8 bits. The coefficient data Ky is separated into three components Ky1, Ky2, and Ky3 each having 8 bits. The yellow data Y'x and the coefficient data Ky compose a yellow group. The coefficient data Km is separated into three components Km1, Km2, and Km3 each having 8 bits. The magenta data M'x and the coefficient data Km compose a magenta group. The coefficient data Kc is separated into three components Kc1, Kc2, and Kc3 each having 8 bits. The cyan data C'x and the coefficient data Kc compose a cyan group.

Four lower bits of each of the input color data R, G, and B are fed to a calculator 55. The coefficient data Ky, Km, and Kc are fed from the ROM 54 to the calculator 55. The four lower bits of the input red data R are represented by "r". The four lower bits of the input green data G are represented by "g". The four lower bits of the input blue data B are represented by "b". The calculator 55 calculates interpolation yellow data yz, interpolation magenta data mz, and interpolation cyan data cz from the input color data "r", "g", and "b" and the coefficient data Ky, Km, and Kc according to the following equations.

$$yz = Ky1 \cdot r + Ky2 \cdot g + Ky3 \cdot b$$

$$mz = Km1 \cdot r + Km2 \cdot g + Km3 \cdot b$$

$$cz = Kc1 \cdot r + Kc2 \cdot g + Kc3 \cdot b.$$

The design of the calculator 55 is similar to the design of the calculator of FIG. 3.

The color data Y'x, M'x, and C'x are fed from the ROM 54 to adders 56, 57, and 58 respectively. The interpolation data yz, mz, and cz are fed from the calculator 55 to the adders 56, 57, and 58 respectively. The adder 56 adds the yellow data Y'x and the interpolation data yz, generating final yellow data Y'out which is fed to an output terminal 59. The adder 57 adds the magenta data M'x and the interpolation data mz, generating final magenta data M'out which is fed to an output terminal 60. The adder 58 adds the cyan data C'x and the interpolation data cz, generating final cyan data C'out which is fed to an output terminal 61. The achromatic color data Bk'x is directly fed from the ROM 54 to an output terminal 62 as final achromatic color data Bk'out.

Figure 11:
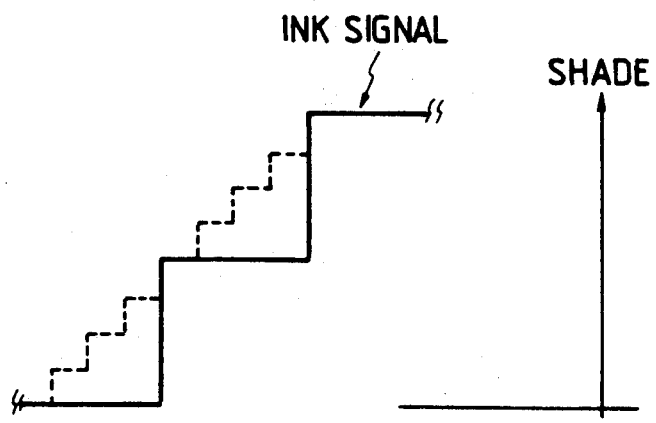
FIG. 11 is a diagram showing the relation between a printing ink signal and a shade.

In the case of a printing machine, the stepwise solid line of FIG. 11 denotes a printing ink signal formed from the achromatic color data Bk'out, and the stepwise dot line of FIG. 11 denotes a printing ink signal obtained by interpolation using the color data Y'x, M'x, and C'x.

As shown in FIG. 4, a color signal composed of red, green, and blue data can be expressed in a three-dimensional coordinate system which corresponds to a color space determined by perpendicular R, G, and B axes corresponding to red, green, and blue data respectively. The R, G, and B axes intersect at the origin O. A color space cube has vertexes which agree with the origin O and points R, G, B, C, Y, M, and W. The points R, G, and B are located on the R, G, and B axes respectively and are equally distant from the origin O. The point C is located on the B-G plane. The point Y is located on the R-G plane. The point M is located on the R-B plane. The points C, Y, and M are equally distant from the origin O. The point W is opposite to the origin O. When the color space cube represented in a first colorimetric system is mapped into a color space represented in another colorimetric system, it is distorted in some cases as shown in FIG. 5.

Each of the R-axis edge, the G-axis edge, and the B-axis edge of the cube is equally divided by a given number N, and the cube is divided into $N^3$ small cubic segments. When each of color data R, G, and B has "n" bits, the number N is given by the relation as "$N=2^n$". For example, when each of color data R, G, and B has 8 bits, the cube is divided into $256^3$ small cubic segments.

In this embodiment, the cube is divided into $16^3$ small cubic segments in accordance with the three sets of the four higher bits of the input color data R, G, and B. The color data Y'x, M'x, and C'x outputted from the ROM 54 in response to the three sets of the four higher bits of the input color data R, G, and B are selected from predetermined data corresponding to the vertexes of the small cubic segments.

As described previously, the calculator 55 calculates the interpolation data yz, mz, and cz from the three sets of the four lower bits of the input color data R, G, and B and the coefficient data Ky, Km, and Kc. The coefficient data Ky, Km, and Kc are given by the ROM 54 in response to the three sets of the four higher bits of the input color data R, G, and B. The final color data Y'out, M'out, and C'out are generated by combining the color data Y'x, M'x, and C'x and the interpolation data yz, mz, and cz. The final achromatic color data Bk'out is equal to the achromatic color data Bk'x.

Figure 12:
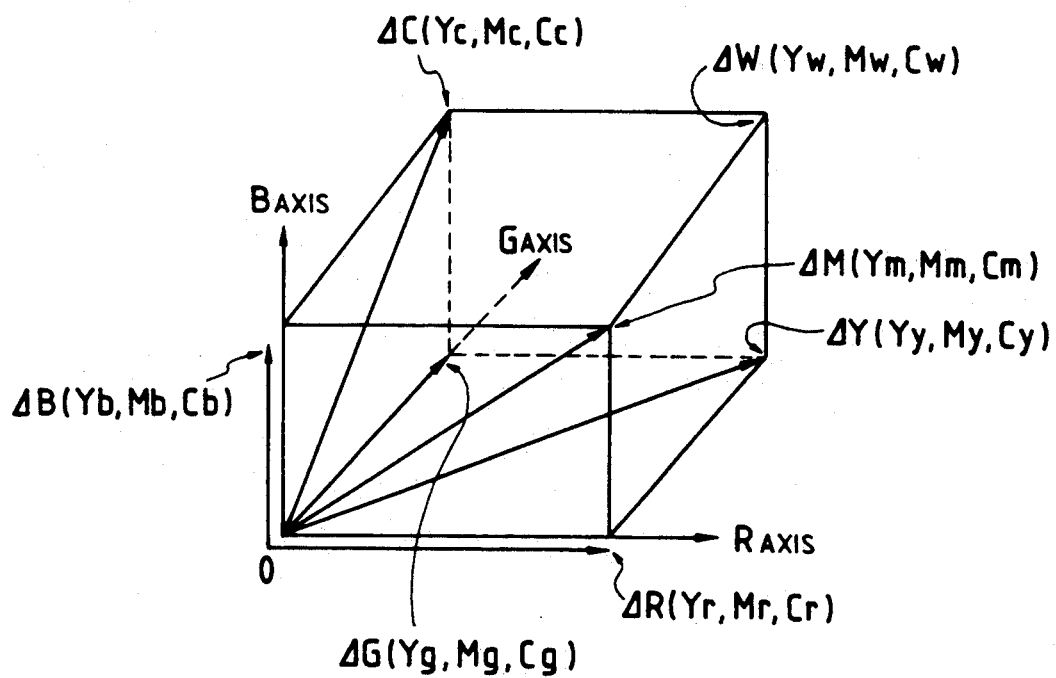
FIG. 12 is a diagram of a box in a color space related to the third embodiment.

The coefficient data Ky1, Ky2, Ky3, Km1, Km2, Km3, Kc1, Kc2, and Kc3 in the ROM 54 are predetermined by using, for example, a computer. Specifically, the coefficient data Ky1, Ky2, Ky3, Km1, Km2, Km3, Kc1, Kc2, and Kc3 are chosen so as to satisfy the following equations.

$$Ky1+Ky2+Ky3=Yw$$

$$Km1+Km2+Km3=Mw$$

$$Kc1+Kc2+Kc3=Cw$$

where Yw, Mw, and Cw denote the respective coordinate components of a vertex point ΔW of FIG. 12 which shows a box in a color space related to variations in color data. These equations are conditions of the fact that, if respective color data vary by equal values, achromatic color data which results from the calculation lies on the achromatic color axis connecting the origin O and the point ΔW in the color space defined with respect to the output color data from the ROM 54, and any tonal jump is prevented. Thus, the interpolation process executed by use of the ROM 54 and the calculator 55 does not cause a deterioration in the white balance and a tonal jump.

With reference to FIG. 12, vertex points ΔR, ΔG, ΔB, ΔC, ΔY, and ΔM are present in addition to the origin O and the vertex point ΔW. With respect to independent variations of three color data, the sums δy, δm, and δc of the squares of the errors from the points ΔR, ΔG, ΔB, ΔC, ΔY, and ΔM are defined as follows.

$$\delta y=(Ky1-Yr)^2+(Ky2-Yg)^2+(Ky3-Yb)^2+(Ky1+Ky2-Yy)^2+(Ky1+Ky3-Ym)^2+(Ky2+Ky3-Yc)^2$$

$$\delta m=(Km1-Mr)^2+(Km2-Mg)^2+(Km3-Mb)^2+(Km1+Km2-My)^2+(Km1+Km3-Mm)^2+(Km2+Km3-Mc)^2$$

$$\delta c=(Kc1-Cr)^2+(Kc2-Cg)^2+(Kc3-Cb)^2+(Kc1+Kc2-Cy)^2+(Kc1+Kc3-Cm)^2+(Kc2+Kc3-Cc)^2$$

The coefficient data Ky1, Ky2, Ky3, Km1, Km2, Km3, Kc1, Kc2, and Kc3 are chosen so as to minimize the sums δy, δm, and δc by use of the least squares method. This design prevents a great color jump for each color which would be caused by a color space distortion.

DESCRIPTION OF THE FOURTH PREFERRED EMBODIMENT

Figure 13:
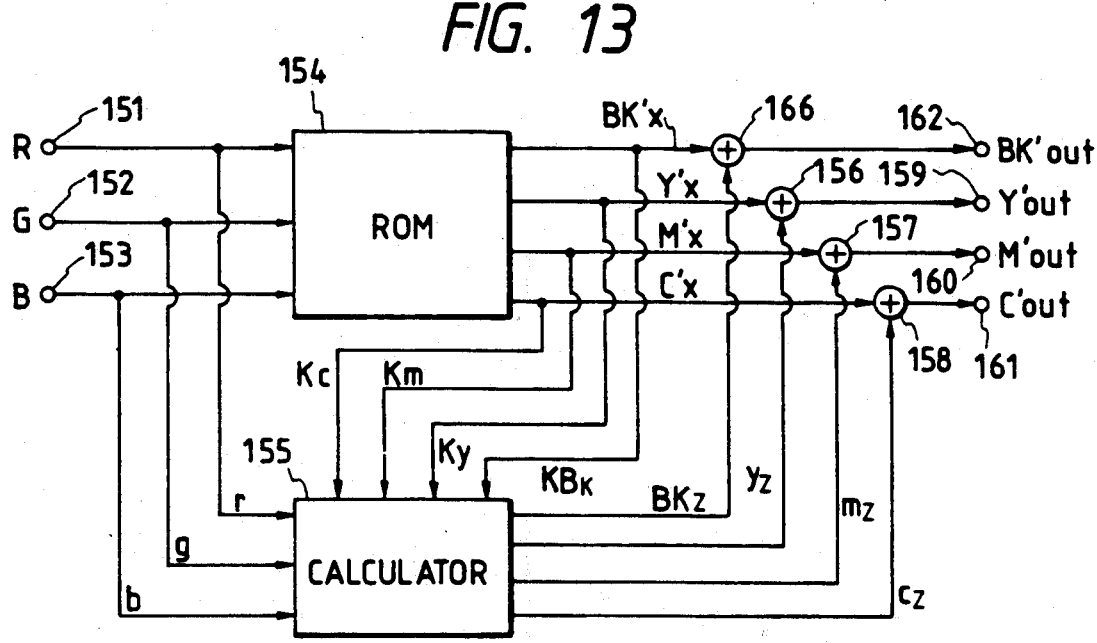
FIG. 13 is a block diagram of a color signal processing apparatus according to a fourth embodiment of this invention.

With reference to FIG. 13, input terminals 151, 152, and 153 are subjected to three input color data, that is, red data R, green data G, and blue data B, respectively. Each of the input color data R, G, and B has 8 bits.

Four higher bits of each of the input color data R, G, and B are fed to a ROM 154 storing a look-up table which has yellow data Y'x, magenta data M'x, cyan data C'x, and achromatic color (black) data Bk'x. The color data Y'x, M'x, C'x, and Bk'x are predetermined as a function of the four higher bits of each of the input color data R, G, and B in a known way. The four higher bits of the input red data R, the four higher bits of the input green data G, and the four higher bits of the input blue data B compose an address signal to the ROM 154, and the corresponding color data Y'x, M'x, C'x, and Bk'x are read out from the ROM 154 in response to the address signal. The look-up table in the ROM 154 also has interpolation coefficient data Ky, Km, Kc, and KBk related to yellow, magenta, cyan, and achromatic color respectively. The coefficient data Ky, Km, Kc, and KBk are predetermined as a function of the four higher bits of each of the input color data R, G, and B. The four higher bits of the input red data R, the four higher bits of the input green data G, and the four higher bits of the input blue data B compose an address signal to the ROM 154, and the corresponding coefficient data Ky, Km, Kc, and KBk are read out from the ROM 154 in response to the address signal.

Figure 14:
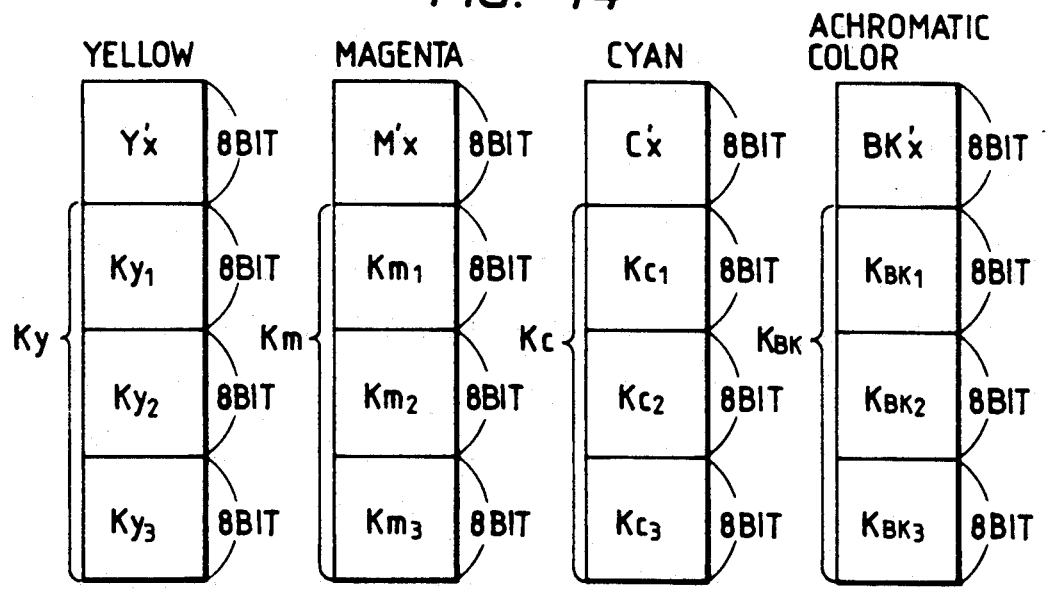
FIG. 14 is a diagram showing color data and coefficient data outputted from the ROM of FIG. 13.

As shown in FIG. 14, each of the color data Y'x, M'x, C'x, and Bk'x has 8 bits. The coefficient data Ky is separated into three components Ky1, Ky2, and Ky3 each having 8 bits. The yellow data Y'x and the coefficient data Ky compose a yellow group. The coefficient data Km is separated into three components Km1, Km2, and Km3 each having 8 bits. The magenta data M'x and the coefficient data Km compose a magenta group. The coefficient data Kc is separated into three components Kc1, Kc2, and Kc3 each having 8 bits. The cyan data C'x and the coefficient data Kc compose a cyan group. The coefficient data KBk is separated into three components KBk1, KBk2, and KBk3 each having 8 bits. The achromatic color data Bk'x and the coefficient data KBk compose an achromatic color (black) group.

Four lower bits of each of the input color data R, G, and B are fed to a calculator 155. The coefficient data Ky, Km, Kc, and KBk are fed from the ROM 154 to the calculator 155. The four lower bits of the input red data R are represented by "r". The four lower bits of the input green data G are represented by "g". The four lower bits of the input blue data B are represented by "b". The calculator 155 calculates interpolation yellow data yz, interpolation magenta data mz, interpolation cyan data cz, and interpolation achromatic color data Bkz from the input color data "r", "g", and "b" and the coefficient data Ky, Km, Kc, and KBk according to the following equations.

$$yz = Ky1.r + Ky2.g + Ky3.b$$

$$mz = Km1.r + Km2.g + Km3.b$$

$$cz = Kc1.r + Kc2.g + Kc3.b$$

$$Bkz = KBk1.r + KBk2.g + KBk3.b.$$

Figure 15:
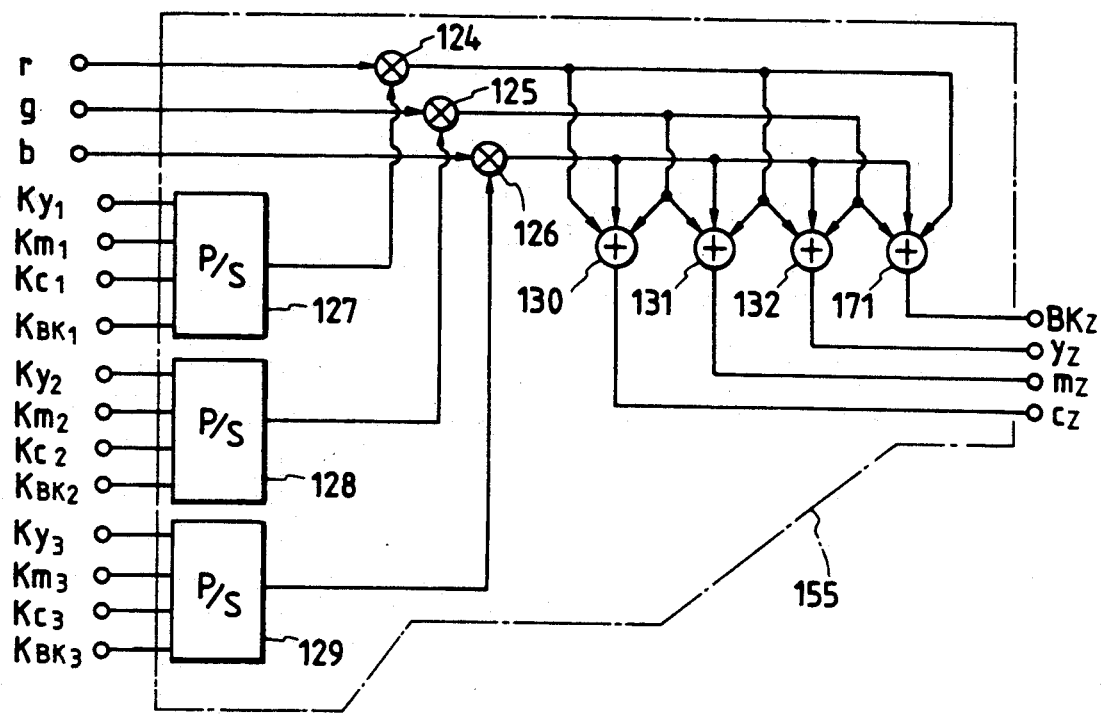
FIG. 15 is a block diagram of the calculator of FIG. 13.

As shown in FIG. 15, the calculator 155 includes multipliers 124, 125, and 126, parallel-to-serial (P/S) converters 127, 128, and 129, and adders 130, 131, 132, and 171. The P/S converter 127 converts the parallel coefficient data Ky1, Km1, Kc1, and KBk1 into corresponding serial data. The P/S converter 128 converts the parallel coefficient data Ky2, Km2, Kc2, and KBk2 into corresponding serial data. The P/S converter 129 converts the parallel coefficient data Ky3, Km3, Kc3, and KBk3 into corresponding serial data. The multiplier 124 multiplies the input red data "r" by the output data from the P/S converter 127, generating data Ky1.r, Km1.r, Kc1.r, and KBk1.r. The multiplier 125 multiplies the input green data "g" by the output data from the P/S converter 128, generating data Ky2.g, Km2.g, Kc2.g, and KBk2.g. The multiplier 126 multiplies the input blue data "b" by the output data from the P/S converter 129, generating data Ky3.b, Km3.b, Kc3.b, and KBk3.b. The adder 130 adds the output data from the multipliers 124, 125, and 126, generating the interpolation data cz. The adder 131 adds the output data from the multipliers 124, 125, and 126, generating the interpolation data mz. The adder 132 adds the output data from the multipliers 124, 125, and 126, generating the interpolation data yz. The adder 171 adds the output data from the multipliers 124, 125, and 126, generating the interpolation data Bkz.

The color data Y'x, M'x, C'x, and Bk'x are fed from the ROM 154 to adders 156, 157, 158, and 166 respectively. The interpolation data yz, mz, cz, and Bkz are fed from the calculator 155 to the adders 156, 157, 158, and 166 respectively. The adder 156 adds the yellow data Y'x and the interpolation data yz, generating final yellow data Y'out which is fed to an output terminal 159. The adder 157 adds the magenta data M'x and the interpolation data mz, generating final magenta data M'out which is fed to an output terminal 160. The adder 158 adds the cyan data C'x and the interpolation data cz, generating final cyan data C'out which is fed to an output terminal 161. The adder 166 adds the achromatic color data Bk'x and the interpolation data Bkz, generating final achromatic color data Bk'out which is fed to an output terminal 162.

A color signal composed of red, green, and blue data can be expressed in a three-dimensional coordinate system which corresponds to a color space determined by perpendicular R, G, and B axes corresponding to red, green, and blue data respectively. The R, G, and B axes intersect at the origin O. A color space cube has vertexes which agree with the origin O and points R, G, B, C, Y, M, and W. The points R, G, and B are located on the R, G, and B axes respectively and are equally distant from the origin O. The point C is located on the B-G plane. The point Y is located on the R-G plane. The point M is located on the R-B plane. The points C, Y, and M are equally distant from the origin O. The point W is opposite to the origin O. In some cases, a color space is distorted.

Each of the R-axis edge, the G-axis edge, and the B-axis edge of the cube is equally divided by a given number N, and the cube is divided into $N^3$ small cubic segments. When each of color data R, G, and B has "n" bits, the number N is given by the relation as "$N = 2^n$". For example, when each of color data R, G, and B has 8 bits, the cube is divided into $256^3$ small cubic segments.

In this embodiment, the cube is divided into $16^3$ small cubic segments in accordance with the three sets of the four higher bits of the input color data R, G, and B. The color data Y'x, M'x, C'x, and Bk'x outputted from the ROM 154 in response to the three sets of the four higher bits of the input color data R, G, and B are selected from predetermined data corresponding to the vertexes of the small cubic segments.

As described previously, the calculator 155 calculates the interpolation data yz, mz, cz, and Bkz from the three sets of the four lower bits of the input color data R, G, and B and the coefficient data Ky, Km, Kc, and KBk. The coefficient data Ky, Km, Kc, and KBk are given by the ROM 154 in response to the three sets of the four higher bits of the input color data R, G, and B. The final color data Y'out, M'out, C'out, and Bk'out are generated by combining the color data Y'x, M'x, C'x, and Bk'x and the interpolation data yz, mz, cz, and Bkz.

Figure 16:
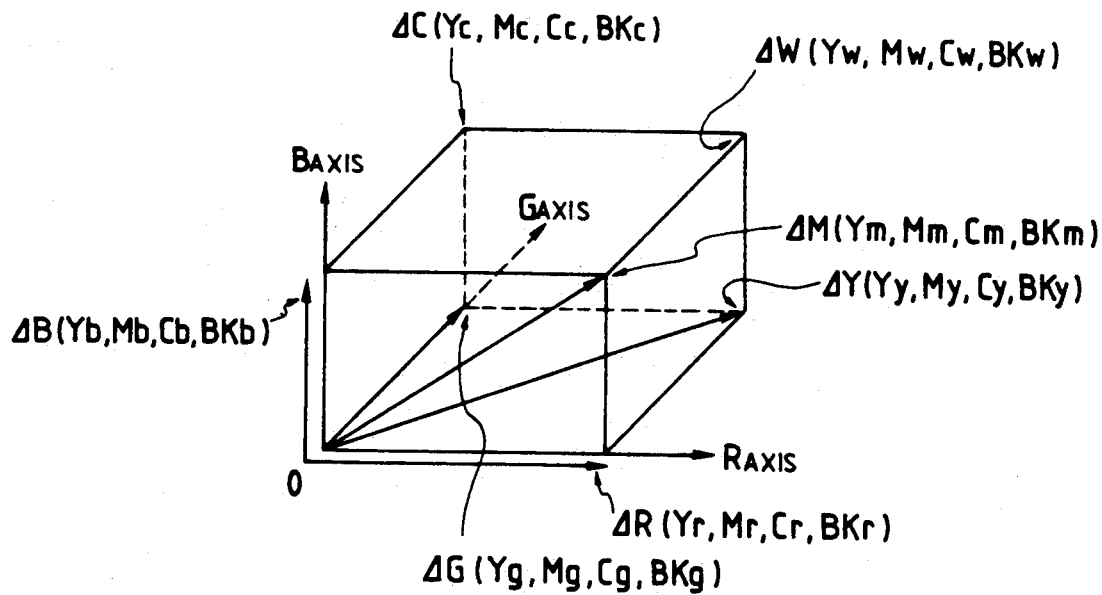
FIG. 16 is a diagram of a box in a color space related to the fourth embodiment.

The coefficient data Ky1, Ky2, Ky3, Km1, Km2, Km3, Kc1, Kc2, Kc3, KBk1, KBk2, and KBk3 in the ROM 154 are predetermined by using, for example, a computer. Specifically, the coefficient data Ky1, Ky2, Ky3, Km1, Km2, Km3, Kc1, Kc2, Kc3, KBk1, KBk2, and KBk3 are chosen so as to satisfy the following equations.

$$Ky1 + Ky2 + Ky3 = Yw$$

$$Km1 + Km2 + Km3 = Mw$$

$$Kc1 + Kc2 + Kc3 = Cw$$

$$KBk1 + KBk2 + KBk3 = Bkw$$

where Yw, Mw, Cw, and Bkw denote the respective coordinate components of a vertex point ΔW of FIG. 16 which shows a box in a color space related to variations in color data. These equations are conditions of the fact that, if respective color data vary by equal values, achromatic color data which results from the calculation lies on the achromatic color axis connecting the origin O and the point ΔW in the color space defined with respect to the output color data from the ROM 154, and any tonal jump is prevented. Thus, the interpolation process executed by use of the ROM 154 and the calculator 155 does not cause a deterioration in the white balance and a tonal jump.

With reference to FIG. 16, vertex points ΔR, ΔG, ΔB, ΔC, ΔY, and ΔM are present in addition to the origin 0 and the vertex point ΔW. With respect to independent variations of three color data, the sums δy, δm, δc, and δBk of the squares of the errors from the points ΔR, ΔG, ΔB, ΔC, ΔY, and ΔM are defined as follows.

$$\delta y = (Ky1-Yr)^2 + (Ky2-Yg)^2 + (Ky3-Yb)^2 + (Ky1+Ky2-Yy)^2 + (Ky1+Ky3-Ym)^2 + (Ky2+Ky3-Yc)^2$$

$$\delta m = (Km1-Mr)^2 + (Km2-Mg)^2 + (Km3-Mb)^2 + (Km1+Km2-My)^2 + (Km1+Km3-Mm)^2 + (Km2+Km3-Mc)^2$$

$$\delta c = (Kc1-Cr)^2 + (Kc2-Cg)^2 + (Kc3-Cb)^2 + (Kc1+Kc2-Cy)^2 + (Kc1+Kc3-Cm)^2 + (Kc2+Kc3-Cc)^2$$

$$\delta Bk = (KBk1-Bkr)^2 + (KBk2-Bkg)^2 + (KBk3-Bkb)^2 + (KBk1+KBk2-Bky)^2 + (KBk1+KBk3-Bkm)^2 + (KBk2+KBk3-Bkc)^2.$$

The coefficient data Ky1, Ky2, Ky3, Km1, Km2, Km3, Kc1, Kc2, Kc3, KBk1, KBk2, and KBk3 are chosen so as to minimize the sums δy, δm, δc, and δBk by use of the least squares method. This design prevents a great color jump for each color which would be caused by a color space distortion.

DESCRIPTION OF THE FIFTH PREFERRED EMBODIMENT

Figure 17:
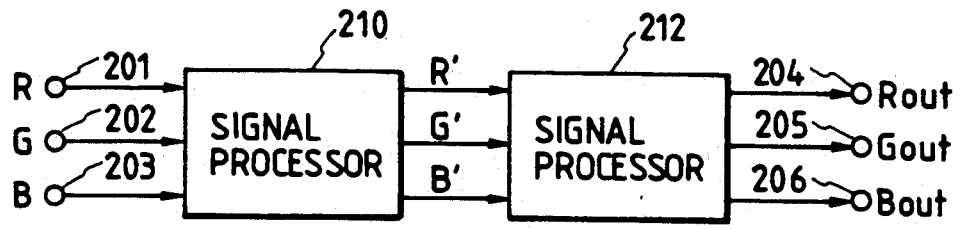
FIG. 17 is a block diagram of a color signal processing apparatus according to a fifth embodiment of this invention.

With reference to FIG. 17, three input color data, that is, red data R, green data G, and blue data B, are fed to a first signal processor 210 via input terminals 201, 202, and 203 respectively. Each of the input color data R, G, and B has 8 bits. The first signal processor 210 processes the input color data R, G, and B for color correction, and converts the input color data R, G, and B into second red data R', second green data G', and second blue data B'. Each of the second color data R', G', and B' has 8 bits.

Figure 18:
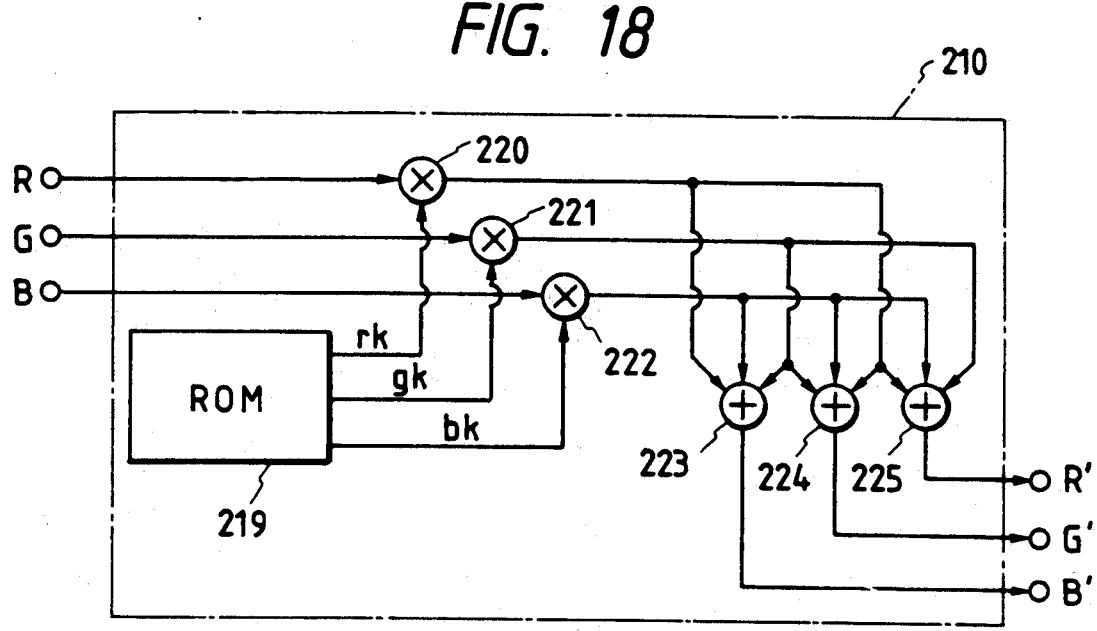
FIG. 18 is a block diagram of the first signal processor of FIG. 17.

As shown in FIG. 18, the first signal processor 210 includes a ROM 219, multipliers 220, 221, and 222, and adders 223, 224, and 225. The ROM 219 stores predetermined coefficient data rk, gk, and bk related to red, green, and blue respectively. The coefficient data rk is separated into three components rk1, rk2, and rk3. The coefficient data gk is separated into three components gk1, gk2, and gk3. The coefficient data bk is separated into three components bk1, bk2, and bk3. The coefficient data rk, gk, and bk are fed from the ROM 219 to the multipliers 220, 221, and 222 respectively. The input color data R, G, and B are fed to the multipliers 220, 221, and 222 respectively. The multiplier 220 multiplies the input red data R and the coefficient data rk, generating data "rk1.R", "rk2.R", and "rk3.R". The multiplier 221 multiplies the input green data G and the coefficient data gk, generating data "gk1.G", "gk2.G", and "gk3.G". The multiplier 222 multiplies the input blue data B and the coefficient data bk, generating data "bk1.B", "bk2.B", and "bk3.B". The adder 223 adds the output data from the multiplier 220, 221, and 222, generating the second blue data B'. The adder 224 adds the output data from the multiplier 220, 221, and 222, generating the second green data G'. The adder 225 adds the output data from the multiplier 220, 221, and 222, generating the second red data R'. Specifically, the second red data R', and the second green data G', and the second blue data B' are expressed as follows.

$$R' = rk1.R + gk1.G + bk1.B$$

$$G' = rk2.R + gk2.G + bk2.B$$

$$B' = rk3.R + gk3.G + bk3.B.$$

The characteristics of the color correction executed by the first signal processor 210 are determined by the coefficient data rk, gk, and bk. For example, when a change in the white balance is required, the coefficient data rk1, gk2, and bk3 are varied. When a change in the degree of the saturation of red is required, the coefficient data rk1 is increased and the coefficient data rk2 and rk3 are made negative. When red is required to move toward magenta, the coefficient data rk1 is increased and the coefficient data rk2 is made zero or negative but the coefficient data rk3 is made positive.

The second color data R', G', and B' are fed from the first signal processor 210 to a second signal processor 212. The second signal processor 212 processes the second color data R', G', and B' for color correction, and converts the second color data R', G', and B' into final red data Rout, final green data Gout, and final blue data Bout. Each of the final color data Rout, Gout, and Bout has 8 bits. The final color data Rout, Gout, and Bout are fed from the second signal processor 212 to output terminals 204, 205, and 206 respectively. The design of the second signal processor 212 is similar to the design of the signal processor of FIG. 1.

DESCRIPTION OF THE SIXTH PREFERRED EMBODIMENT

Figure 19:
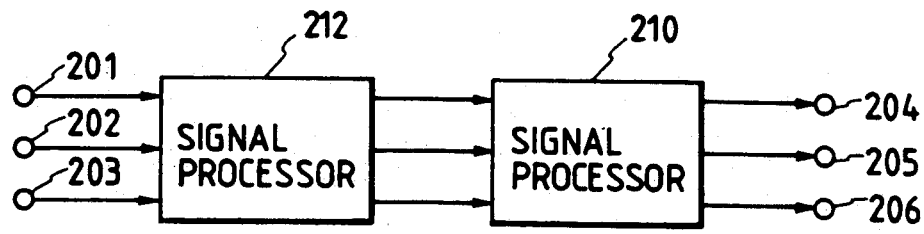
FIG. 19 is a block diagram of a color signal processing apparatus according to a sixth embodiment of this invention.

FIG. 19 shows a sixth embodiment of this invention which is similar to the embodiment of FIGS. 17 and 18 except that the first signal processor 210 and the second signal processor 212 are exchanged in position.

DESCRIPTION OF THE SEVENTH PREFERRED EMBODIMENT

Figure 20:
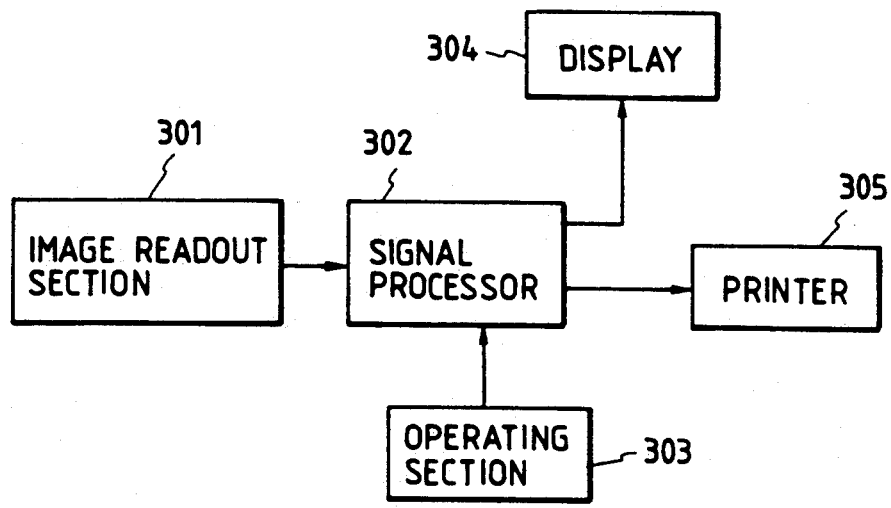
FIG. 20 is a block diagram of a color copying machine according to a seventh embodiment of this invention.

With reference to FIG. 20, a color copying machine includes an image readout section 301 which outputs red, green, and blue data R, G, and B representing an image to be copied. The image readout section 301 has a photoelectric conversion element array. The color data R, G, and B outputted from the image readout section 301 are processed by a signal processor 302 for color correction. The output signal from the signal processor 302 is fed to a color CRT display 304 and a printer 305. The display 304 indicates the image represented by the output signal from the signal processor 302. The printer 305 prints out the image represented by the output signal from the signal processor 302. As will be described later, the signal processor 302 includes a switch which can be operated via an operating section 303.

Figure 21:
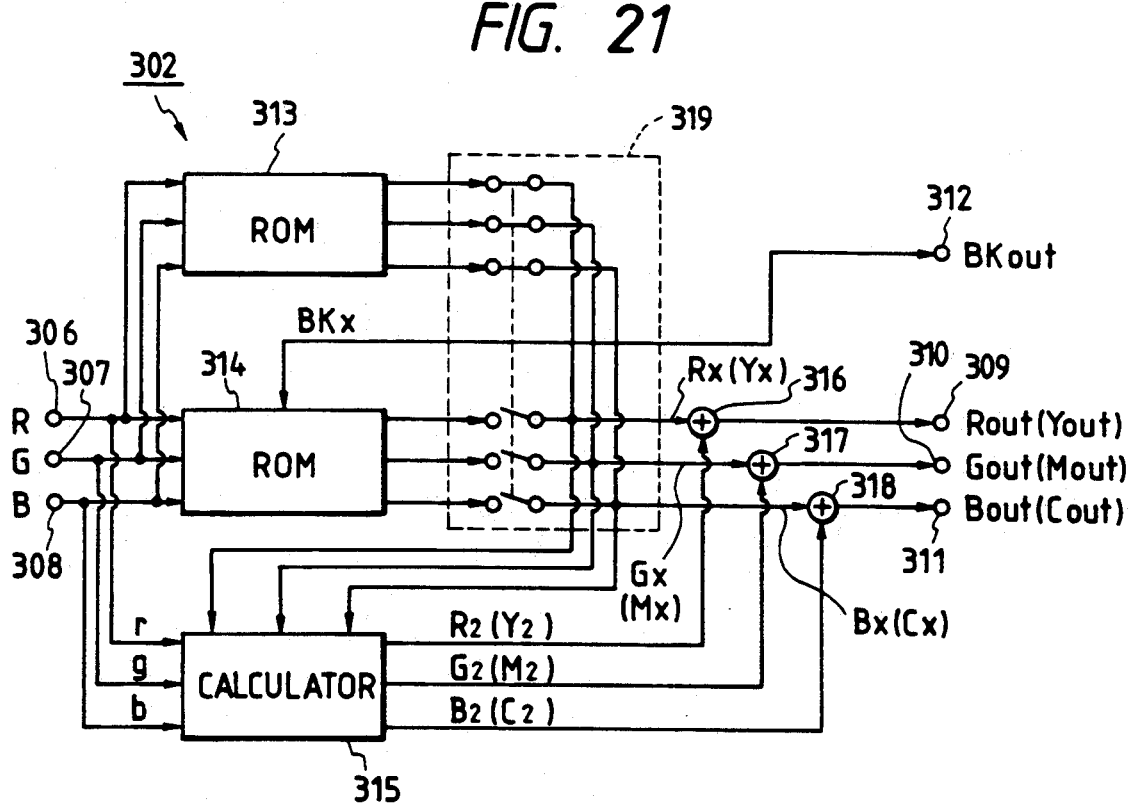
FIG. 21 is a block diagram of the signal processor of FIG. 20.

As shown in FIG. 21, the signal processor 302 includes ROMs 313 and 314, a calculator 315, adders 316, 317, and 318, and a switch 319. Four higher bits of each of the color data R, G, and B are fed to the ROMs 313 and 314 via input terminals 306, 307, and 308. The ROM 313 outputs second red data Rx, second green data Gx, second blue data Bx, and coefficient data Kr, Kg, and Kb in response to the three sets of the four higher bits of the color data R, G, and B. The design of the ROM 313 is similar to the design of the ROM 4 of FIG. 1. The ROM 314 outputs yellow data Yx, magenta data Mx, cyan data Cx, achromatic color (black) data Bkx, and coefficient data Ky, Km, and Kc in response to the three sets of the four higher bits of the color data R, G, and B. The design of the ROM 314 is similar to the design of the ROM 54 of FIG. 9.

The switch 319 can be changed between first and second positions via the operating section 303 (see FIG. 20). When the switch 319 assumes the first position, the ROM 313 is connected to the calculator 315 and the adders 316–318 but the ROM 314 is disconnected from the calculator 315 and the adders 316–318. When the switch 319 assumes the second position, the ROM 313 is disconnected from the calculator 315 and the adders 316–318 but the ROM 314 is connected to the calculator 315 and the adders 316–318.

When the switch 319 assumes the first position, the coefficient data Kr, Kg, and Kb are transmitted from the ROM 313 to the calculator 315, and the second color data Rx, Gx, and Bx are transmitted from the ROM 313 to the adders 316, 317, and 318 respectively. Four lower bits of each of the input color data R, G, and B are fed to the calculator 315. The calculator 315 calculates interpolation data Rz, Gz, and Bz from the three sets of the lower four bits of the input color data R, G, and B and the coefficient data Kr, Kg, and Kb in a manner similar to the manner of the interpolation data calculation by the calculator 5 of FIG. 1. The design of the calculator 315 is similar to the design of the calculator 5 of FIGS. 1 and 3. The interpolation data Rz, Gz, and Bz are fed from the calculator 315 to the adders 316, 317, and 318 respectively. The adder 316 adds the second red data Rx and the interpolation data Rz, generating final red data Rout which is fed to an output terminal 309. The adder 317 adds the second green data Gx and the interpolation data Gz, generating final green data Gout which is fed to an output terminal 310. The adder 318 adds the second blue data Bx and the interpolation data Bz, generating final blue data Bout which is fed to an output terminal 311. As understood from the previous description, when the switch 319 assumes the first position, the signal processor 302 functions as the signal processor of FIG. 1.

When the switch 319 assumes the second position, the coefficient data Ky, Km, and Kc are transmitted from the ROM 314 to the calculator 315, and the color data Yx, Mx, and Cx are transmitted from the ROM 314 to the adders 316, 317, and 318 respectively. The achromatic color data Bkx is directly transmitted from the ROM 314 to an output terminal 312. Four lower bits of each of the input color data R, G, and B are fed to the calculator 315. The calculator 315 calculates interpolation data Yz, Mz, and Cz from the three sets of the lower four bits of the input color data R, G, and B and the coefficient data Ky, Km, and Kc in a manner similar to the manner of the interpolation data calculation by the calculator 55 of FIG. 9. The design of the calculator 315 is similar to the design of the calculator 55 of FIG. 9. The interpolation data Yz, Mz, and Cz are fed from the calculator 315 to the adders 316, 317, and 318 respectively. The adder 316 adds the yellow data Yx and the interpolation data Yz, generating final yellow data Yout which is fed to the output terminal 309. The adder 317 adds the magenta data Mx and the interpolation data Mz, generating final magenta data Mout which is fed to the output terminal 310. The adder 318 adds the cyan data Cx and the interpolation data Cz, generating final cyan data Cout which is fed to the output terminal 311. As understood from the previous description, when the switch 319 assumes the second position, the signal processor 302 functions as the signal processor of FIG. 9.

What is claimed is:

1. In a conversion of a first set of different digital color signals represented in a first colorimetric system into a second set of different color signals represented in a second colorimetric system by use of a memory storing data of predetermined main parts of the second set of the color signals and data of calculation coefficients which are designed to vary as functions of first portions of the first set of the color signals, each of said first portions represented by a predetermined number of upper bits from among total bits representing each of the different digital color signals, a method comprising the steps of:

combining the first portions of the first set of the color signals into an address signal;

applying the address signal to the memory, reading out data of the main parts of the second set of the color signals from the memory which correspond to the first portions of the first set of the color signals, and reading out data of the calculation coefficients from the memory which correspond to the first portions of the first set of the color signals;

calculating, for interpolation, subordinate parts of the second set of the color signals from second portions of the first set of the color signals, each of said second portions represented by a predetermined number of remaining lower bits from among the total bits representing each of the different digital color signals, and the readout data of the calculation coefficients according to an interpolation using a predetermined function between the second portions of the first set of the color signals and the readout data of the calculation coefficients, the predetermined function being expressed by a polynomial having two or more terms; and combining the readout data of the main parts of the second set of the color signals and the calculated subordinate parts of the second set of the color signals into a whole of the second set of the color signals;

wherein the calculation coefficient data are calculated so that, (i) if each of the color signals in the first set change by a common equal value, achromatic color data which results from the calculation step lies on an achromatic color axis in a color space defined with respect to the readout data of the main parts of the second set of the color signals, and (ii) if only one of the color signals of the first set changes, that the sum of squared errors of a color conversion is minimized, and (iii) if two and only two of the color signals of the first set change, squared errors are minimized.

2. The method of claim 1 wherein the color signals in the first set relate to red, green, and blue respectively, and the color signals in the second set relate to red, green, and blue respectively.

3. The method of claim 1 wherein the color signals in the first set relate to red, green, and blue respectively, and the color signals in the second set relate to yellow, magenta, and cyan respectively.

4. The method of claim 1 wherein the first colorimetric system is three-dimensional and the second colorimetric system is of four dimensions one of which represents an achromatic color.

5. In a conversion of a first set of different color signals represented in a first colorimetric system into a second set of different color signals represented in a second colorimetric system by use of a memory storing data of predetermined main parts of the second set of the color signals and data of calculation coefficients which are designed to vary as functions of first portions of the first set of the color signals, each of said first portions represented by a predetermined number of upper bits from among total bits representing each of the different digital color signals, an apparatus comprising:

means for combining the first portions of the first set of the color signals into an address signal;

means for applying the address signal to the memory, reading out data of the main parts of the second set of the color signals from the memory which correspond to the first portions of the first set of the color signals, and reading out data of the calculation coefficients from the memory which correspond to the first portions of the first set of the color signals;

means for calculating subordinate parts of the second set of the color signals from second portions of the first set of the color signals, each of said second portions is represented by a predetermined number of remaining lower bits from among the total bits representing each of the different digital color signals, and the readout data of the calculation coefficients according to an interpolation using a predetermined function between the second portions of the first set of the color signals and the readout data of the calculation coefficients, the predetermined function being expressed by a polynomial having two or more terms; and means for combining the readout data of the main parts of the second set of the color signals and the calculated subordinate parts of the second set of the color signals into a whole of the second set of the color signals;

wherein the calculation coefficient data are calculated so that, (i) if each of the color signals in the first set change by a common equal value, achromatic color data which results from the calculation step lies on an achromatic color axis in a color space defined with respect to the readout data of the main parts of the second set of the color signals, and that (ii) if only on of the color signals of the first set changes, the sum of squared errors of a color conversion is minimized, and (iii) if two and only two of the color signals of the first set change, squared errors are minimized.

6. An apparatus comprising:

means for determining predetermined main parts of output color signals represented in a second colorimetric system in response to first portions of input digital color signals represented in a first colorimetric system, each of said first portions represented by a predetermined number of upper bits from among total bits representing each of the different digital color signals;

means for selecting one of sets of predetermined calculation coefficients in response to the first portions of the input color signals;

means for calculating subordinate parts of the output color signals from second portions of the input color signals, each of which second portions is represented by a predetermined number of remaining lower bits from among the total bits representing each of the different digital color signals, and the selected calculation coefficients according to an interpolation using a predetermined function between the second portions of the input color signals and the selected calculation coefficients, the predetermined function being expressed by a polynomial having two or more terms; and means for combining the determined main parts of the output color signals and the calculated subordinate parts of the output color signals into a whole of the output color signals;

wherein the predetermined calculation coefficients are calculated so that, (i) if each of the input color signals change by a common equal value, achromatic color data represented by the output color signals remains on an achromatic color axis in a color space defined with respect to the determined main parts of the output color signals, and (ii) if one or more of the input signals change, the predetermined calculation coefficients are chosen whereby a conversion error is minimized using a least squares method.

7. An apparatus comprising:

means for determining predetermined main parts of output digital color signals in response to predetermined first portions of input digital color signals;

means for selecting one of sets of predetermined calculation coefficients in response to the first portions of the input color signals;

means for calculating predetermined subordinate parts of the output color signals from predetermined second portions of the input color signals and the selected calculation coefficients according to an interpolation using a predetermined function between the second portions of the input color signals and the selected calculation coefficients; and means for combining the determined main parts of the output color signals and the calculated subordinate parts of the output color signals into a whole of the output color signals.

wherein the predetermined calculation coefficients are selected so that, (i) if each of the input color signals change by a common equal value, achromatic color data represented by the output color signals remains on an achromatic color axis in a color space defined with respect to the determined main parts of the output color signals, and (ii) if at least one of the input color signals changes, the predetermined calculation coefficients are selected to minimize a color error according to a least squares method.

* * * * *